Sept. 8, 1936.　　　P. J. FLAMMANG　　　2,053,606
VEHICLE VENTILATING MEANS
Filed Dec. 23, 1933　　　2 Sheets-Sheet 1
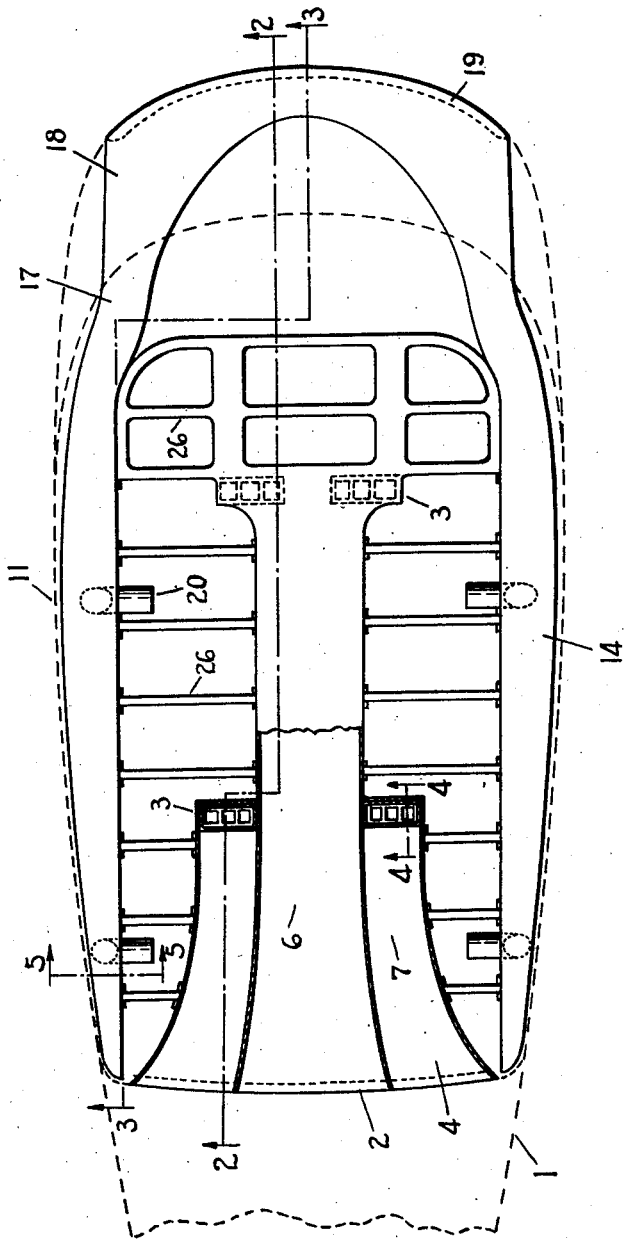
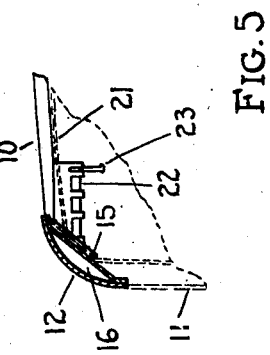
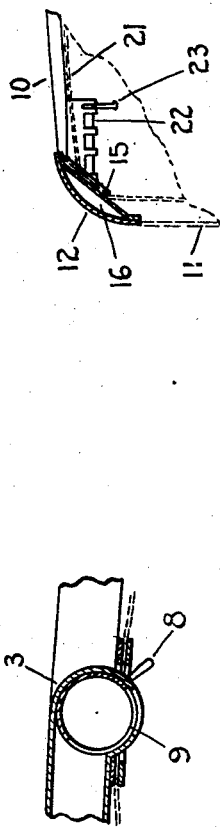
Inventor
PETER J. FLAMMANG
By Owen H. Spencer
Attorney Patented Sept. 8, 1936

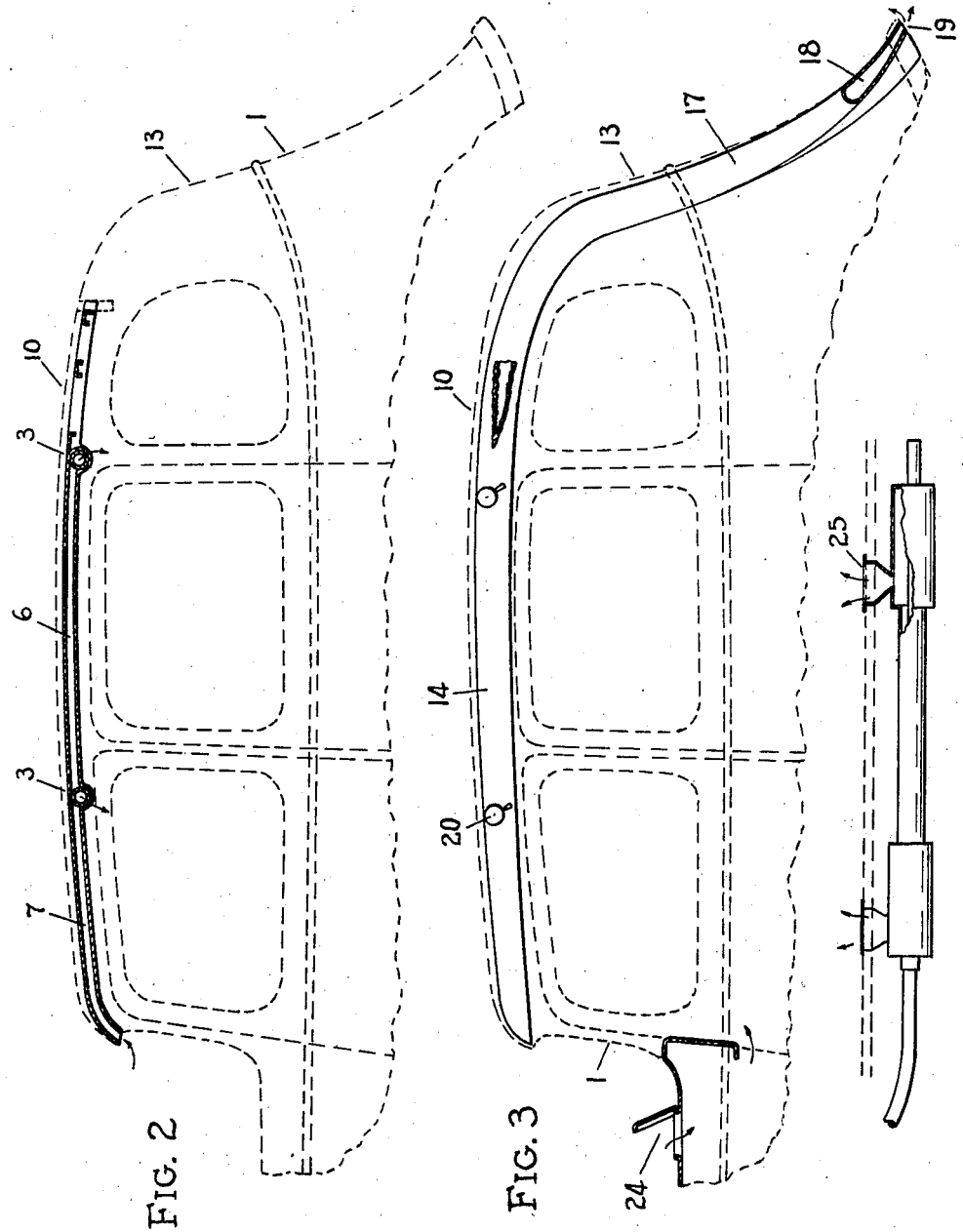

2,053,606

UNITED STATES PATENT OFFICE 2,053,606

VEHICLE VENTILATING MEANS

Peter J. Flammang, Beech Grove, Ind.

Application December 23, 1933, Serial No. 703,799

1 Claim. (Cl. 98—2)

The invention is a means to ventilate the passenger compartment of closed body vehicles more especially during the overland movement of same, and provides for selectively controlled distribution of the incoming air from co-directed mouths, as well as providing distributed air exits which may be opened individually as desired to permit the flow of air there-through to a final outlet.

It is a primary object of the invention to provide a free flow of air through substantially any or all parts of the vehicle interior or lessen the movement of same through parts of the vehicle as desired.

It is another primary object to provide co-related mouths which open forwardly with the vehicle, said mouths communicating with different air inlet shutters by which feature the pressure of air resistance against the forward end of the vehicle in overland movement thereof causes air to flow freely through such inlets from such mouths.

It is also a primary object to provide a final air outlet vent which opens rearwardly in substantially the rearward termination of the vehicle body, said final outlet communicating with air exit shutters spaced apart in the vehicle body by which arrangement the drawing together of the air at the rear of such vehicle during the overland movement thereof will set up an air suction at such final outlet sufficient to draw air through said exits from within the vehicle.

It is an important object to embody the invention in a vehicle in a manner that the apparatus forms a co-ordinating structure with the frame of the vehicle body.

It is a further object to use the invention independently, or cooperatingly with other vehicle ventilating means and with conventional vehicle heating means.

The above and other objects are attained by the structure and arrangement of parts explained in connection with the accompanying drawings, in which:

Figure 1 is a partly sectional plan view of the invention the general outlines of the vehicle being indicated by dotted lines;

Figure 2 is a fragmentary sectional view taken in the proximity of line 2—2 of Figure 1, said view being more especially a cross section of the air admitting part of the invention;

Figure 3 is a cross sectional view taken in the proximity of line 3—3 of Figure 1, and is more especially a sectional view of the air discharging part of the invention, a cowl air inlet and an ordinary vehicle heater being also indicated;

Figure 4 is a detail cross sectional view taken in the proximity of line 4—4 of Figure 1; and, Figure 5 is a detail cross sectional view taken in the proximity of line 5—5 of Figure 1.

Similar characters of reference designate similar parts throughout the different views.

Referring to the numeral 1 of Figure 1, the dotted lines designated thereby indicate diagrammatically the general outline of the vehicle with which the invention is illustrated. The numeral 2 designates the mouth through which air is supplied to the inlet shutters 3, and the numeral 4 designates the mouths through which air is supplied to the more forwardly disposed inlet shutters 5. Said mouths open downwardly and form with the overhanging crown portion of the body a forwardly extending hood, which prevents the entrance of rain, dust or the like. The mouth 2 lies between the mouths 4, the mouth 2 communicating with the shutters 5, through the central air conduit 6, and the mouths 4 communicating with the shutters 3 through the air conduits 7. Said conduits flare outwardly to said mouths as considered in Figure 1, and serve to somewhat funnel air into said inlet shutters, the air being induced to enter the same due to head pressure of the vehicle against the air, in the overland movement of the vehicle.

The shutters 3 are located forwardly and serve to admit air to the occupants in the more forward portions of the vehicle, the shutters 3 serving the rearwardly seated occupants. Each of said shutters are manually closed and opened by the levers 8, which operate the shutter slides 9, which in this example of the invention are rotary shutter slides, said levers being in convenient reach of the respective occupants, by which arrangement substantially any occupant may be supplied with a more or less amount of air by rotating the respective shutter slide a more or less amount by operation of the particular lever 8, within most convenient reach of the occupant.

In the usual construction of closed vehicle bodies, it is customary to construct a top or crown portion 10, which merges with the sides 11 of the rounded corner structure 12, which extend substantially throughout the length of the body and extend downwardly to unite the rearward wall 13 of the body with the sides thereof. The discharge ventilating conduits 14 of the invention is principally formed by securing an interior plate 15, chord like across the curve of the rounded corner structure, as illustrated in Figure 5, along each side of the vehicle, the space 16 between said plate and corner structure forming the discharge conduits. Said plates continue rearwardly and extend downwardly at 17 in the same relation to the more vertical portions of said rounded corners and terminate in this example of the invention in a single discharge vent 18, said plates uniting interiorly of the body and forming said vent with the rearward wall 13 of the vehicle body. The mouth 19 of said vent forms an opening in the rearward extremity of the body, by which feature the reuniting of air behind the vehicle while traveling overland, causes a suction at said mouth drawing air through the discharge conduits 14 from the air exit shutters 20, which communicate with said conduits and extend through the ceiling 21 of the vehicle at distributed points. Said exit shutters are provided with shutter slides 22, which in this example of the invention are rotary shutter slides operated by the levers 23, said levers being in convenient reach of the vehicle occupant sitting in that respective part of the vehicle, by which arrangement it will be understood that the occupant is free to open the respective exit shutter a more or less amount as desired in discharging air from within that part of the vehicle.

As shown in Figure 1 and Figure 2, the exit shutters 20 are provided in forward and rearward sets, corresponding to the forward and rearward air inlet shutters 3. The forward exit shutters set are preferably positioned in advance of the forward inlet shutter set, and the rearward exit shutter set is likewise positioned ahead of the rearward inlet shutter set by which feature the air admitted through the inlet conduits 6 and 7 is more completely circulated in the vehicle in reaching said outlet shutters from whence it travels through the discharge conduits 14 and thence out through the vent 18 and mouth 19.

It will be understood that the inlet shutters, conduits and mouths do not depend for utility under all conditions upon the presence of the exit shutter set are preferably positioned in advance may be omitted in certain installations although there is however in the example of the invention shown cooperation between the two, since it will be obvious that any occupant may cause air to be admitted and discharged, or both, as desired in the respective vehicle portion, by operation of the levers 8 and 23, and in this connection it is understood that the air supply may be admitted entirely or collaterally with the closable cowl vent 24 or through the vehicle heaters 25, or by other means.

The air inlet conduits 6 and 7, are concealed between the vehicle ceiling 21 and the roof covering of the crown portion 10, the air admitting parts of the inlet shutters being exposed through corresponding openings in said ceiling. Roof and ceiling supporting ribs 26 attach to said inlet conduits and the air discharge conduits 14, and form therewith the fabricating frame structure for the upper body portion, said frame structure being strong and sufficiently pliable as a whole to permit slight springing with the remainder of the vehicle structure, as required in vehicle body frames.

It is understood that when the vehicle is not under motion that air will move in the opposite direction through the portion 17 of the discharge conduits 14 by natural chimney draft force, and that when desirable to ventilate interior of a vehicle not under motion, the exhaust shutters 20, and inlet shutters 3, may be left open so that a movement of air will thus take place through the conduits 14, 6 and 7 then.

While the description and drawings illustrate in a general way certain constructions which may be employed in carrying the invention into effect, it is obvious that many modifications may be made in the various details without departing from the scope of the appended claims, it being understood that the invention is not restricted to the particular example herein described.

The invention claimed is:

In combination with a vehicle body having the usual seats arranged therein, a hood-like mouth arranged at the front of the body at the top above the windshield and passages communicating with said mouth extending rearwardly and spaced from the sides of the car, a plurality of air inlets opening into said passages arranged approximately above the front and rear seats, independently operated shutters controlling said air inlets for selectively serving air to said seating places and side passages arranged on each side of said hood-like mouth and leading rearwardly to the rear end of the body and discharging at the lower end of the body and an air outlet spaced some distance forward of each air inlet on each side and communicating with said side passages.

PETER J. FLAMMANG.